United States Patent
Kim et al.

(10) Patent No.: US 9,781,560 B2
(45) Date of Patent: Oct. 3, 2017

(54) RANGING OVER MULTIPLE ANTENNAS

(71) Applicant: QUALCOMM Incorporated, San Diego, CA (US)

(72) Inventors: Beomsup Kim, San Jose, CA (US); Ning Zhang, Saratoga, CA (US); Xiaoxin Zhang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/881,761

(22) Filed: Oct. 13, 2015

(65) Prior Publication Data

US 2017/0006422 A1 Jan. 5, 2017

Related U.S. Application Data

(60) Provisional application No. 62/188,311, filed on Jul. 2, 2015.

(51) Int. Cl.
| | | |
|---|---|---|
| *H04W 24/00* | (2009.01) | |
| *H04W 4/02* | (2009.01) | |
| *G01S 13/76* | (2006.01) | |
| *H04W 64/00* | (2009.01) | |
| *G01S 11/16* | (2006.01) | |

(Continued)

(52) U.S. Cl.
CPC ............. *H04W 4/023* (2013.01); *G01S 11/16* (2013.01); *G01S 13/767* (2013.01); *H04B 7/0602* (2013.01); *H04W 64/00* (2013.01); *H04W 84/12* (2013.01)

(58) Field of Classification Search
CPC ..... H04W 4/023; H04W 64/00; H04W 84/12; H04W 24/10; G01S 11/16; G01S 13/767; H04B 7/0602
USPC .............................. 455/456.1–456.6; 370/338
See application file for complete search history.

(56) References Cited

U.S. PATENT DOCUMENTS

2010/0260284 A1* 10/2010 Yoshii .................. H04B 7/0671
375/295
2015/0005016 A1 1/2015 Palanki
(Continued)

OTHER PUBLICATIONS

ISA/EP, International Search Report and Written Opinion of the International Searching Authority, Int'l Application No. PCT/US2016/040515, Sep. 16, 2016, European Patent Office, Rijswijk, NL, 11 pgs.

*Primary Examiner* — Marcos Batista
(74) *Attorney, Agent, or Firm* — Holland & Hart LLP; Thien T. Nguyen

(57) ABSTRACT

Methods, systems, and devices are described for wireless communication. An example method includes receiving, by a first wireless communication device having a plurality of antennas disposed at a localized position, a plurality of fine timing management (FTM) messages from a second wireless communication device. The example method includes transmitting, by the first wireless communication device, a plurality of FTM responses to the second wireless communication device. Each of the plurality of FTM responses may be transmitted using a different antenna of the first wireless communication device. The example method also includes estimating a range between the first wireless communication device and the second wireless communication device based at least in part on the plurality of FTM messages.

30 Claims, 8 Drawing Sheets

(51) Int. Cl.
*H04B 7/06* (2006.01)
*H04W 84/12* (2009.01)

(56) References Cited

U.S. PATENT DOCUMENTS

| | | |
|---|---|---|
| 2015/0087330 A1* | 3/2015 | Prechner ................ G01S 5/14 455/456.1 |
| 2015/0098460 A1 | 4/2015 | Wang et al. |
| 2015/0099538 A1 | 4/2015 | Wang et al. |
| 2015/0181553 A1* | 6/2015 | Segev ................ H04W 64/00 455/456.1 |

* cited by examiner

RANGING OVER MULTIPLE ANTENNAS

CROSS REFERENCES

The present application for patent claims priority to U.S. Provisional Patent Application No. 62/188,311 by Zhang et al., entitled "Ranging Over Multiple Antennas," filed Jul. 2, 2015, assigned to the assignee hereof, and expressly incorporated by reference herein.

BACKGROUND

Field of the Disclosure

The present disclosure, for example, relates to wireless communication systems, and more particularly to techniques for ranging over multiple antennas.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless local area network (WLAN) is an example of a multiple-access system and are widely deployed and used. Other examples of multiple-access systems may include code-division multiple access (CDMA) systems, time-division multiple access (TDMA) systems, frequency-division multiple access (FDMA) systems, and orthogonal frequency-division multiple access (OFDMA) systems.

A WLAN, such as a WiFi (IEEE 802.11) network, may include one or more access point (APs) that may communicate with one or more stations (STAs) or mobile devices. The APs and STAs may perform timing measurement procedures to measure a round trip time (RTT) between two devices (e.g., between APs, STAs, or an AP and STA). This RTT can be used to estimate a range between the two devices and determine a location of one device with respect to the other device. Ranging accuracy is important for certain wireless communication system operations.

SUMMARY

The present description discloses techniques for ranging over multiple antennas. According to these techniques, wireless communication devices can accurately measure a RTT with respect to other wireless communication devices. For example, a first wireless communication device (e.g., an AP or STA) receives two or more fine timing management (FTM) messages (e.g., FTM frames) from a second wireless communication device (e.g., another AP or STA). In this example, the first wireless device is an initiation device, and the second wireless communication device is a responding device. The first wireless communication device transmits two or more FTM responses (e.g., acknowledgements to the FTM frames) to the second wireless communication device. Each of the FTM responses is transmitted using a different antenna of the first wireless communication device. The first wireless communication device may estimate a range between the first wireless communication device and the second wireless communication device based at least in part on the FTM messages.

In another example, a second wireless communication device receives an FTM request from a first wireless communication device. In this example, the first wireless device is an initiation device, and the second wireless communication device is a responding device. The second wireless communication device transmits two or more FTM messages to the first wireless communication device. Each of the FTM messages is transmitted using a different antenna of the second wireless communication device.

The present description also discloses techniques for estimating a RTT and line-of-sight propagation between the first wireless communication device and the second wireless communication device.

A method for wireless communication is described. In some examples, the method includes receiving, by a first wireless communication device having a plurality of antennas disposed at a localized position, a plurality of FTM messages from a second wireless communication device, transmitting, by the first wireless communication device, a plurality of FTM responses to the second wireless communication device, wherein each of the plurality of FTM responses is transmitted using a different antenna of the first wireless communication device, and estimating a range between the first wireless communication device and the second wireless communication device based at least in part on the plurality of FTM messages.

A communication device is described. In some example, the communication device includes a plurality of antennas disposed at a localized position, a timing measurement manager to receive a plurality of FTM messages from a responding wireless communication device, the timing measurement manager to transmit a plurality of FTM responses to the responding wireless communication device, an antenna switching manager to switch antennas such that each of the plurality of FTM responses is transmitted using a different antenna of the plurality of antennas, and a ranging estimator to estimate a range between the communication device and the responding wireless communication device based at least in part on the plurality of FTM messages.

Another communication device includes means for receiving a plurality of FTM messages from a responding wireless communication device, means for transmitting a plurality of FTM responses to the responding wireless communication device, means for switching antennas such that each of the plurality of FTM responses is transmitted using a different antenna of a plurality of antennas disposed at a localized position, and means for estimating a range between the communication device and the responding wireless communication device based at least in part on the plurality of FTM messages.

A non-transitory computer-readable medium is described. The non-transitory computer-readable medium includes computer-readable code that, when executed, causes a device to receive a plurality of FTM messages from a responding wireless communication device, transmit a plurality of FTM response to the responding wireless communication device, switch antennas such that each of the plurality of FTM responses is transmitted using a different antenna of a plurality of antennas disposed at a localized position, and estimate a range between the device and the responding wireless communication device based at least in part on the plurality of FTM messages.

Regarding the above-described method, communication devices, and non-transitory computer-readable medium, receiving the FTM messages by the first wireless communication device can include receiving a first FTM message, and receiving a second FTM message, the second FTM message comprising round trip time information corresponding to the first FTM message from a perspective of the second wireless communication device. Transmitting the FTM messages by the first wireless communication device can include transmitting a first FTM response corresponding to the first FTM message using a first antenna of the first wireless communication device, and transmitting a second FTM response corresponding to the second FTM message using a second antenna of the first wireless communication device.

The second antenna can be disposed a distance from the first antenna that is less than two wavelengths of the transmission frequency associated with the antennas disposed at the localized position. The round trip time information can be based at least in part on an elapsed amount of time between a transmission of the first FTM message by the second wireless communication device and a receipt of the first FTM response by the second wireless communication device.

Receiving the FTM frames by the first wireless communication device can additionally include receiving a third FTM message, the third FTM message comprising round trip time information corresponding to the second FTM message from the perspective of the second wireless communication device. Transmitting the FTM messages by the first wireless communication device can include transmitting a third FTM response corresponding to the third FTM message using a third antenna of the first wireless communication device. Estimating the range between the first wireless communication device and the second wireless communication device can be further based at least in part on the third FTM message.

Estimating the range between the first wireless communication device and the second wireless communication device can further include determining an estimated round trip time between the first wireless communication device and the second wireless communication device based at least in part on the round trip time information corresponding to the first FTM message and the round trip time information corresponding to the second FTM message.

It can be determined that one of the antennas of the first wireless communication device is associated with a line-of-sight propagation between the first wireless communication device and the second wireless communication device based at least in part on the FTM messages.

A control message can be transmitted to the second wireless communication device to coordinate antenna switching by the second wireless communication device between subsequent transmissions of the FTM messages.

Each of the FTM messages can be an FTM frame and each of the FTM responses can be an acknowledgment of an FTM frame.

A method for wireless communication is described. In some examples, the method includes receiving, by a second wireless communication device, an FTM request from a first wireless communication device, and transmitting, by the second wireless communication device, a plurality of FTM messages to the first wireless communication device, wherein each of the plurality of FTM messages is transmitted using a different antenna of the second wireless communication device.

A communication device is described. In some examples, the communication device includes a plurality of antennas disposed at a localized position, a timing measurement manager to receive an FTM request from an initiating wireless communication device, the timing measurement manager to transmit a plurality of FTM messages to the initiating wireless communication device, and an antenna switching manager to switch antennas such that each of the plurality of FTM messages is transmitted using a different antenna of the plurality of antennas.

Another communication device includes means for receiving an FTM request from an initiating wireless communication device, means for transmitting a plurality of FTM messages to the initiating wireless communication device, and means for switching antennas such that each of the plurality of FTM messages is transmitted using a different antenna of a plurality of antennas disposed at a localized position.

A non-transitory computer-readable medium is disclosed. The non-transitory computer-readable medium includes computer-readable code that, when executed, causes a device to receive an FTM request from an initiating wireless communication device, transmit a plurality of FTM messages to the initiating wireless communication device, and switch antennas such that each of the plurality of FTM messages is transmitted using a different antenna of a plurality of antennas disposed at a localized position.

Regarding the above-described method, communication devices, and non-transitory computer-readable medium, transmitting the FTM messages can include transmitting a first FTM message using a first antenna of the second wireless communication device, and transmitting a second FTM message using a second antenna of the second wireless communication device, the second FTM message comprising round trip time information corresponding to the first FTM message from a perspective of the second wireless communication device.

The second antenna being can be disposed a distance from the first antenna that is less than two wavelengths of the transmission frequency associated with the plurality of antennas disposed at the localized position.

A first FTM response corresponding to the first FTM message can be received from the first wireless communication device. The round trip time information can be based at least in part on an elapsed amount of time between a transmission of the first FTM message by the second wireless communication device and a receipt of the first FTM response by the second wireless communication device.

Transmitting the FTM frames to the first wireless communication device can additionally include transmitting a third FTM message using a third antenna of the second wireless communication device, the third FTM message comprising round trip time information corresponding to the second FTM message from the perspective of the second wireless communication device.

A control message from the first wireless communication device can be received to coordinate antenna switching by the second wireless communication device between subsequent transmissions of the FTM messages.

FTM responses from the first wireless communication device can be received by the second wireless communication device. Each of the FTM responses can be received using a different antenna of the second wireless communication device.

Further scope of the applicability of the described systems, methods, devices, or computer-readable media will become apparent from the following detailed description, claims, and drawings. The detailed description and specific examples are given by way of illustration only, and various changes and modifications within the scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
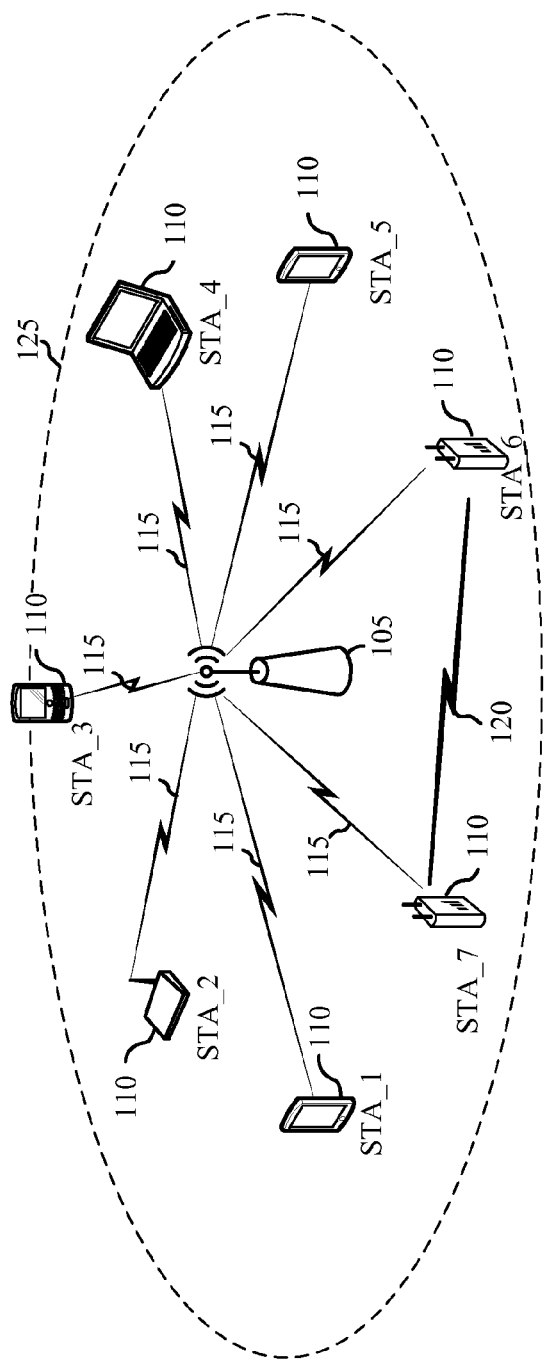
FIG. 1 illustrates an example of a wireless communication system, such as a WLAN, that supports ranging over multiple antennas in accordance with various aspects of the present disclosure.

According to aspects of the present disclosure, a wireless communication device, such as an access point (AP) or a station (STA), utilizes techniques for ranging over multiple antennas. An initiating device (e.g., an AP or an STA) that wishes to engage a responding device (e.g., an AP or an STA) for timing measurement procedures sends a fine timing measurement (FTM) request to the responding device. The FTM request initiates a procedure for estimating a range between the initiating device and the responding device.

Ranging accuracy is decided or determined by a bandwidth of the FTM frames that are transmitted. FTM frames using larger bandwidths, for example, can provide more information of the multipath wireless channel. As such, better timing accuracy can be achieved in estimating an arrival path on a first FTM transmission, resulting in better round trip time (RTT) and ranging accuracy. In certain implementations, (e.g., utilizing a communication system under IEEE 802.11REVmc), the bandwidth is limited to 160 MHz, and thus the information that can be sent by an FTM frame is limited. Accordingly, the present disclosure provides techniques to achieve ranging accuracy when a largest portion of available bandwidth of a wireless channel is already being used. For example, by extending ranging to multiple antennas, wireless channel information can be obtained via different spatial links to further improve ranging accuracy.

In response to the FTM request, the responding device transmits a first FTM frame to the initiating device, and the initiating device transmits an acknowledgment to the first FTM frame. The responding device and the initiating device generate timestamps associated with the transmission and receipt of the first FTM frame and the acknowledgment of the first FTM frame. One or both of the initiating device and the responding device then switches to a different antenna such that subsequent FTM frames and associated acknowledgements are transmitted and/or received via different wireless communication channels or propagation paths. The initiating device (or alternatively a device receiving information from the initiating device) then estimates a range between the initiating device and the responding device based at least in part on the FTM frames and associated acknowledgements.

In some wireless communication devices (e.g., an AP or STA), antennas are placed generally close to each other on the wireless communications device such that the ranges to different antennas may be similar. The channel information to different antennas of a wireless communication is independent, however, if the antennas of the wireless communication device are placed more than $\lambda/2$ apart, where $\lambda$ represents wavelength of the wireless communication (e.g., only 3 cm in 5 GHz WiFi channel). This independent channel information can provide independent RTT estimation results. The RTT results derived from different antenna combinations between the initiating device and responding device can be combined to reduce any random error and thereby improve timing measurement accuracy.

In this regard, RTT measurements from each of the multiple antennas of a wireless communication device that are disposed at a localized position (e.g., where each antenna is spaced apart no more than approximately a number full wavelengths (i.e., 2, 3, or 4 full wavelengths in some radio frequency spectrum systems), where multiple antennas are disposed on the wireless communication device generally at a single location, where multiple antennas are disposed together in a clustered base but located away from the wireless communication device, etc.) can be used fine tune or refine a final distance estimation between the wireless communication device and another wireless communication device. For example, the wireless communication device may have four antennas, each separated by approximately 3 cm to 24 cm apart (e.g., for a 5 GHz WiFi device). These antennas may be integrated within a casing or housing of the wireless communication device (e.g., a mobile handset or tablet computer) or may be moveably attached to one or more sides of a casing or housing of the wireless communication device (e.g., an access point). While the distance separation between antennas at the same general location may be too small to perform triangulation procedures for determining a location of another device, each of these antennas can be used to provide similarly correlated distance measurements to determine a precise line-of-sight propagation associated with a 5 GHz WiFi channel (or other radio frequency spectrum channel such as, but not limited to, a 2.4 GHz WiFi channel) between another device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a wireless local area network (WLAN) 100 in accordance with various aspects of the present disclosure. The WLAN 100 includes an access point (AP) 105 and STAs 110 labeled as STA_1 through STA_7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 may have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 may be stationary or mobile. Additionally, each AP 105 and STA 110 may include multiple antennas.

While, the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. Examples of direct wireless communication links 120 include WiFi Direct connections, connections established by using a WiFi Tunneled Direct Link Setup (TDLS) link, and other peer-to-peer (P2P) group connections.

The STAs 110 and APs 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, etc. Thus, WLAN 100 implements a contention-based protocol that allows a number of devices (e.g., STAs 110 and APs 105) to share the same wireless medium (e.g., a channel) without pre-coordination. To prevent several devices from transmitting over the channel at the same time each device in a BSS operates according to certain procedures that structure and organize medium access, thereby preventing interference between the devices.

To achieve timing measurement accuracy, an AP 105 or STA 110 as the initiating device receives two or more FTM frames that are transmitted from another AP 105 or STA 110 as the responding device. Each of the FTM frames received by the AP 105 or STA 110 as the initiating device may be received using a different antenna; additionally or alternatively, each of the FTM frames transmitted by the AP 105 or STA 110 as the responding device may be transmitted using a different antenna. The AP 105 or STA 110 as the initiating device estimates a range between the two devices engaged in the timing measurement procedure based at least in part on information associated with the two or more FTM frames received and information associated with acknowledgements of the two or more FTM frames.

Figure 2:
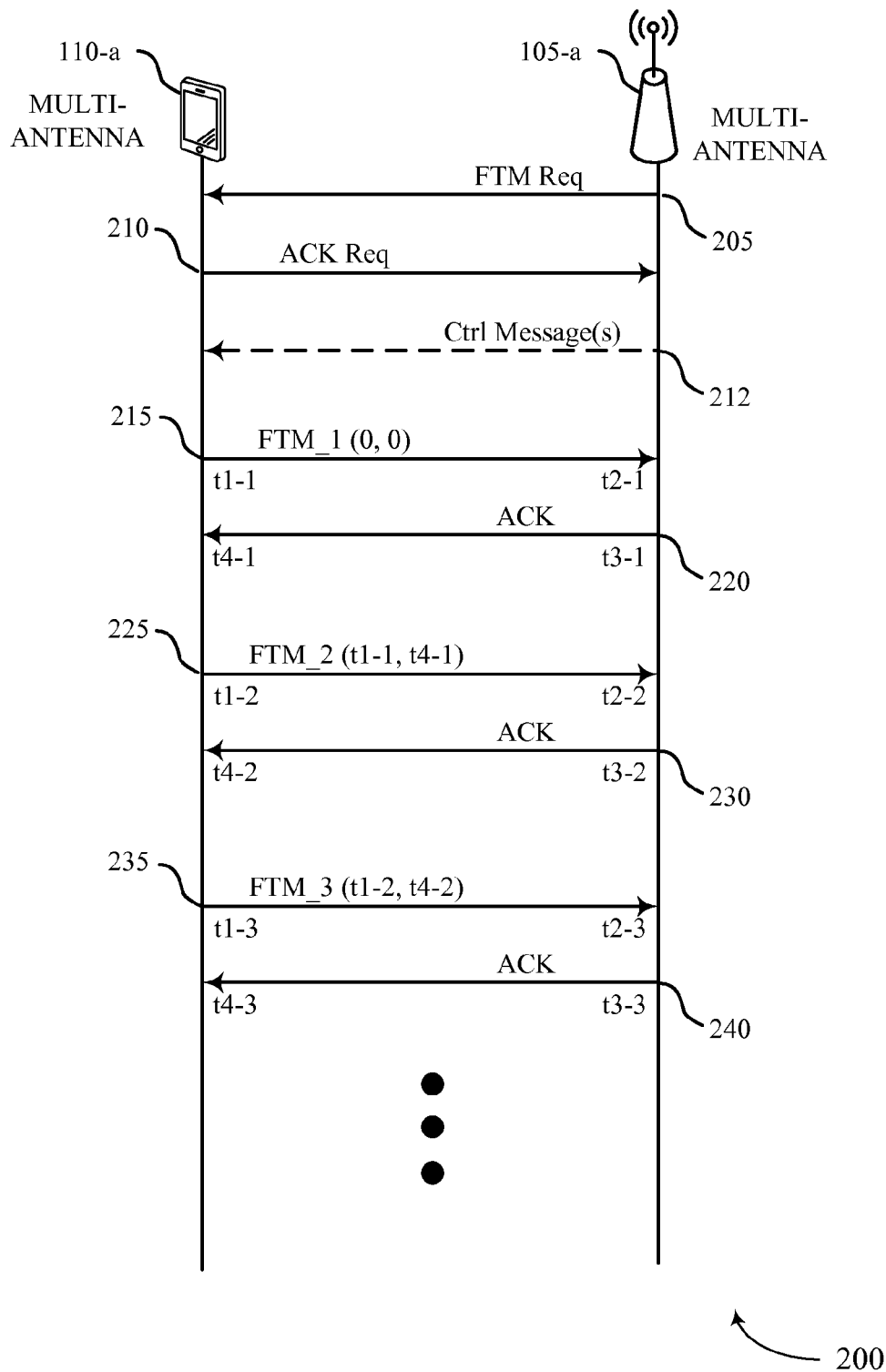
FIG. 2 shows a process flow illustrating an example of wireless communication devices that support ranging over multiple antennas in accordance with various aspects of the present disclosure.

FIG. 2 shows a process flow 200 illustrating an example of wireless communication devices that support ranging over multiple antennas in accordance with various aspects of the present disclosure. The process flow 200 in the wireless communication system shown in FIG. 2 is illustrated with respect to AP 105-$a$ and STA 110-$a$, which are respective examples of the AP 105 and STA 110 of FIG. 1. In this example, AP 105-$a$ is the initiating device and associates and communicates with STA 110-$a$, which is the responding device. Additionally, both AP 105-$a$ and STA 110-$a$ are multi-antenna devices. The multiple antennas of AP 105-$a$ are disposed at a same location (e.g., adjacent antennas closely spaced approximately $\lambda/2$ to $4\lambda$ apart). Similarly, the multiple antennas of STA 110-$a$ are disposed at a same location (e.g., adjacent antennas closely spaced approximately $\lambda/2$ to $4\lambda$ apart). It is to be understood that other combinations of devices (e.g., APs 105 and STAs 110) are contemplated in the example provided with respect to FIG. 2.

AP 105-$a$ wishes to engage in timing measurement procedures with STA 110-$a$ and determines that STA 110-$a$ is available on a wireless communication channel (e.g., communication links 115 or communication links 120 of FIG. 1). In some cases, the STA 110-$a$ wishes to engage in timing measurement procedures with AP-105-$a$ and communicates as much to AP 105-$a$. AP 105-$a$ transmits an FTM request 205 to STA 110-$a$. STA 110-$a$ receives the FTM request 205 from AP 105-$a$ and transmits an acknowledgment 210 of the FTM request to AP 105-$a$. AP 105-$a$ receives the acknowledgment 210 of the FTM request from STA 110-$a$ and prepares to receive a number of FTM frames.

In some implementations, AP 105-$a$ transmits a control message 212 to STA 110-$a$ to coordinate antenna switching by STA 110-$a$ between subsequent transmissions of FTM frames. For example, the control message 212 includes instructions to STA 110-$a$ to switch antennas prior to transmitting subsequent FTM frames (e.g., when AP 105-$a$ and STA 110-$a$ have the same number of multiple antennas). In some implementations, switch coordination information is included in the FTM request 205 itself. In other implementations, switch coordination information is determined a priori and is known by STA-$a$.

STA 110-$a$ transmits a first FTM frame 215 associated with a first time t1-1 at which the first FTM frame 215 was transmitted by STA 110-$a$. STA 110-$a$ generates a timestamp for first time t1-1 to be used later in the example timing measurement procedure. The first FTM frame 215 includes some general information regarding the FTM frame and is transmitted via a first antenna of STA 110-$a$. AP 105-$a$ receives the first FTM frame 215 and identifies a second time t2-1 at which the first FTM frame 215 was received. For example, AP 105-$a$ generates a timestamp for the second time t2-1. The first FTM frame 215 is received via a first antenna of AP 105-$a$. In some cases, the first FTM frame 215 is received via each antenna of AP 105-$a$, and AP 105-$a$ determines which antenna should be designated the receiving antenna (e.g., which antenna has received the strongest signal or which antenna should be the receiving antenna based on a predetermined antenna switching order based at least in part on switch coordination information).

AP 105-$a$ transmits an acknowledgment message 220 of the first FTM frame 215 via the first antenna of AP 105-$a$. In some cases, the antenna of AP 105-$a$ from which the acknowledgment message 220 of the first FTM frame 215 is transmitted is different from the antenna of AP 105-$a$ that received the first FTM frame 215. AP 105-$a$ associates a third time t3-1 at which the acknowledgment message 220 of the first FTM frame 215 was transmitted via the first antenna of AP 105-$a$. For example, AP 105-$a$ generates a timestamp for the third time t3-1. After transmitting the acknowledgment message 220 of the first FTM frame 215, AP 105-$a$ switches from the first antenna to a second antenna of AP 105-$a$ for receiving the next FTM frame and transmitting the next acknowledgement message.

STA 110-$a$ receives the acknowledgment message 220 of the first FTM frame 215. STA 110-$a$ associates the receipt of the acknowledgment message 220 of the first FTM frame 215 with a fourth time t4-1. For example, STA 110-*a* generates a timestamp for the fourth time t4-1.

After receiving the acknowledgment message 220 of the first FTM frame 215, STA 110-*a* switches from the first antenna to a second antenna of STA 110-*a*. STA 110-*a* transmits a second FTM frame 225. The second FTM frame 225 is transmitted via the second antenna of STA 110-*a* and includes information including the first time t1-1 and the fourth time t4-1 associated with the first FTM frame 215 and the acknowledgment message 220 of the first FTM frame 215. STA 110-*a* also associates the second FTM frame 225 with a first time t1-2 at which the second FTM frame 225 was transmitted by STA 110-*a*. STA 110-*a* generates a timestamp for first time t1-2.

AP 105-*a* receives the second FTM frame 225 via the second antenna of AP 105-*a* and identifies a second time t2-2 at which the second FTM frame 225 was received. AP 105-*a* generates a timestamp for the second time t2-2. AP 105-*a* transmits an acknowledgment message 230 of the second FTM frame 225 via the second antenna of AP 105-*a*. AP 105-*a* associates a third time t3-2 at which the acknowledgment message 230 of the second FTM frame 225 was transmitted via the second antenna of AP 105-*a*. For example, AP 105-*a* generates a timestamp for the third time t3-2. After transmitting the acknowledgment message 230 of the second FTM frame 225, AP 105-*a* switches from the second antenna to a third antenna of AP 105-*a* for receiving the next FTM frame and transmitting the next acknowledgement message.

STA 110-*a* receives the acknowledgment message 230 of the second FTM frame 225 via the second antenna of STA 110-*a*. STA 110-*a* associates the receipt of the acknowledgment message 230 of the second FTM frame 225 with a fourth time t4-2. STA 110-*a* generates a timestamp for fourth time t4-2. After receiving the acknowledgment message 230 of the second FTM frame 225, STA 110-*a* switches from the second antenna to a third antenna of STA 110-*a*.

STA 110-*a* transmits a third FTM frame 235 via the third antenna of STA 110-*a*. The third FTM frame 235 includes information including the first time t1-2 and the fourth time t4-2 associated with the second FTM frame 225 and the acknowledgment message 230 of the second FTM frame 225. STA 110-*a* also associates the third FTM frame 235 with a first time t1-3 at which the third FTM frame 235 was transmitted by STA 110-*a*. STA 110-*a* generates a timestamp for first time t1-3.

AP 105-*a* receives the third FTM frame 235 via the third antenna of AP 105-*a* and identifies a second time t2-3 at which the third FTM frame 235 was received. AP 105-*a* generates a timestamp for the second time t2-3. AP 105-*a* transmits an acknowledgment message 240 of the third FTM frame 235 via the third antenna of AP 105-*a*. AP 105-*a* associates a third time t3-3 at which the acknowledgment message 240 of the third FTM frame 235 was transmitted via the third antenna of AP 105-*a*. AP 105-*a* generates a timestamp for the third time t3-2. After transmitting the acknowledgment message 240 of the third FTM frame 235, AP 105-*a* switches from the third antenna to a next antenna (e.g., a fourth antenna of AP 105-*a* or back to the first antenna of AP 105-*a* if AP 105 only has three antennas).

STA 110-*a* receives the acknowledgment message 240 of the third FTM frame 235 via the third antenna of STA 110-*a*. STA 110-*a* associates the receipt of the acknowledgment message 240 of the third FTM frame 235 with a fourth time t4-3. STA 110-*a* generates a timestamp for fourth time t4-3 to be used in a subsequent transmission to AP 105-*a*. After receiving the acknowledgment message 240 of the third FTM frame 235, STA 110-*a* switches from the third antenna to a next antenna (e.g., a fourth antenna of STA 110-*a* or back to the first antenna of STA 110-*a* if STA 110-*a* only has three antennas). Subsequent FTM frames may be transmitted by STA 110-*a* and received by AP 105-*a*. Acknowledgement messages of the subsequent FTM frames may be transmitted by AP 105-*a* and received by STA 110-*a* as described herein.

Other examples and implementations are contemplated with respect to the multi-antenna AP 105-*a* and multi-antenna STA 110-*a* example described in FIG. 2 as would be apparent by those skilled in the art given the benefit of the present disclosure. For example, where AP 105-*a* has three antennas and STA 110-*a* has two antennas, antenna switching and/or coordination procedures can include the following ordering scheme: STA 110-*a* transmits a first FTM frame via a first antenna to AP 105-*a*; AP 105-*a* transmits an acknowledgement message of the first FTM frame via a first antenna to STA 110-*a*; STA 110-*a* transmits a second FTM frame via a second antenna to AP 105-*a*; AP 105-*a* transmits an acknowledgement message of the second FTM frame via a second antenna to STA 110-*a*; STA 110-*a* transmits a third FTM frame via the first antenna to AP 105-*a*; AP 105-*a* transmits an acknowledgement message of the third FTM frame via a third antenna to STA 110-*a*; STA 110-*a* transmits a fourth FTM frame via the second antenna to AP 105-*a*; AP 105-*a* transmits an acknowledgement message of the fourth FTM frame via the first antenna to STA 110-*a*; etc.

Figure 3:
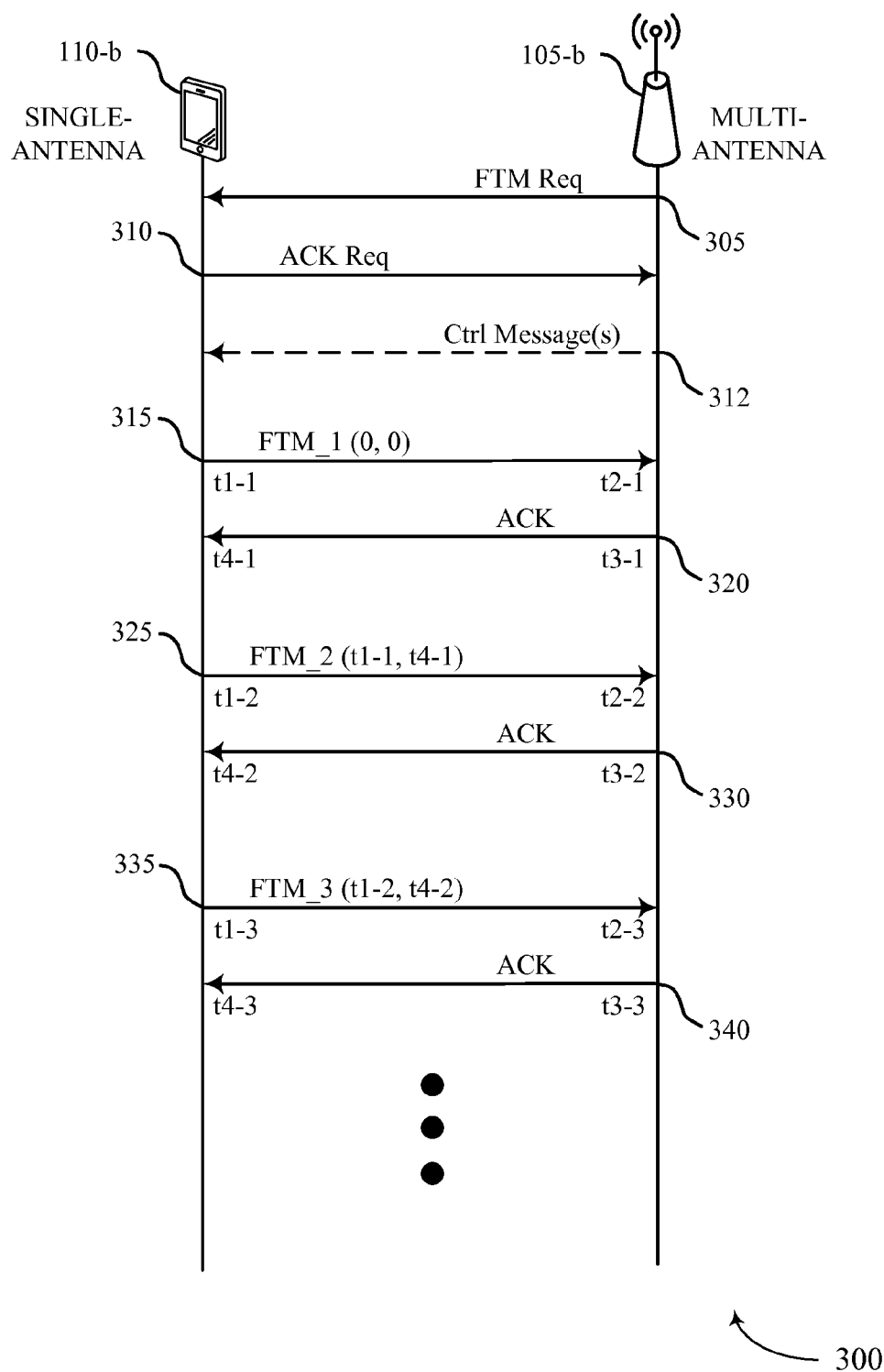
FIG. 3 shows a process flow illustrating an example of wireless communication devices that support ranging over multiple antennas in accordance with various aspects of the present disclosure.

FIG. 3 shows a process flow 300 illustrating an example of wireless communication devices that support ranging over multiple antennas in accordance with various aspects of the present disclosure. The process flow 300 in the wireless communication system shown in FIG. 3 is illustrated with respect to AP 105-*b* and STA 110-*b*, which are respective examples of the AP 105 and STA 110 of FIG. 1. In this example, AP 105-*b* is the initiating device and associates and communicates with STA 110-*b*, which is the responding device. Additionally, AP 105-*b* is a multi-antenna device and STA 110-*b* is a single antenna device. The multiple antennas of AP 105-*b* are disposed at a same location (e.g., adjacent antennas closely spaced approximately $\lambda/2$ to $4\lambda$ apart). It is to be understood that other combinations of devices (e.g., APs 105 and STAs 110) are contemplated in the example provided with respect to FIG. 3.

AP 105-*b* wishes to engage in timing measurement procedures with STA 110-*b* and determine that STA 110-*b* is available on a wireless communication channel (e.g., communication links 115 or communication links 120 of FIG. 1). AP 105-*b* transmits an FTM request 305 to STA 110-*b*. STA 110-*b* receives the FTM request 305 from AP 105-*b* and transmits an acknowledgment 310 of the FTM request to AP 105-*b*. AP 105-*b* receives the acknowledgment 310 of the FTM request from STA 110-*b* and prepares for receive a number of FTM frames.

In some implementations, AP 105-*b* transmits a control message 312 to STA 110-*b* to coordinate antenna switching by STA 110-*b* between subsequent transmissions of FTM frames. For example, the control message 312 includes instructions to STA 110-*b* to transmit N number of FTM frames (e.g., where N corresponds to the number of antennas of AP 105-*b*). In some implementations, switch coordination information is included in the FTM request 305 itself. In other implementations, switch coordination information is determined a priori and is known by STA-b.

STA 110-*b* transmits a first FTM frame 315 associated with a first time t1-1 at which the first FTM frame 315 was transmitted by STA 110-*b*. STA 110-*b* generates a timestamp for first time t1-1 to be used later in the example timing measurement procedure. The first FTM frame 315 includes some general information regarding the FTM frame and is transmitted via the antenna of STA 110-*b*. AP 105-*b* receives the first FTM frame 315 and identifies a second time t2-1 at which the first FTM frame 315 was received. For example, AP 105-*b* generates a timestamp for the second time t2-1. The first FTM frame 315 is received via a first antenna of AP 105-*b*.

AP 105-*b* transmits an acknowledgment message 320 of the first FTM frame 315 via the first antenna of AP 105-*b*. AP 105-*b* associates a third time t3-1 at which the acknowledgment message 320 of the first FTM frame 315 was transmitted via the first antenna of AP 105-*b*. For example, AP 105-*b* generates a timestamp for the third time t3-1. After transmitting the acknowledgment message 320 of the first FTM frame 315, AP 105-*b* switches from the first antenna to a second antenna of AP 105-*b* for receiving the next FTM frame and transmitting the next acknowledgement message.

STA 110-*b* receives the acknowledgment message 320 of the first FTM frame 315. STA 110-*b* associates the receipt of the acknowledgment message 320 of the first FTM frame 315 with a fourth time t4-1. For example, STA 110-*b* generates a timestamp for the fourth time t4-1.

After receiving the acknowledgment message 320 of the first FTM frame 315, STA 110-*b* transmits a second FTM frame 325. The second FTM frame 325 includes information including the first time t1-1 and the fourth time t4-1 associated with the first FTM frame 315 and the acknowledgment message 320 of the first FTM frame 315. STA 110-*b* also associates the second FTM frame 325 with a first time t1-2 at which the second FTM frame 325 was transmitted by STA 110-*b*. STA 110-*b* generates a timestamp for first time t1-2.

AP 105-*b* receives the second FTM frame 325 via the second antenna of AP 105-*b* and identifies a second time t2-2 at which the second FTM frame 325 was received. AP 105-*b* generates a timestamp for the second time t2-2. AP 105-*b* transmits an acknowledgment message 330 of the second FTM frame 325 via the second antenna of AP 105-*b*. AP 105-*b* associates a third time t3-2 at which the acknowledgment message 330 of the second FTM frame 325 was transmitted via the second antenna of AP 105-*b*. For example, AP 105-*b* generates a timestamp for the third time t3-2. After transmitting the acknowledgment message 330 of the second FTM frame 325, AP 105-*b* switches from the second antenna to a third antenna of AP 105-*b* for receiving the next FTM frame and transmitting the next acknowledgement message.

STA 110-*b* receives the acknowledgment message 330 of the second FTM frame 325. STA 110-*b* associates the receipt of the acknowledgment message 330 of the second FTM frame 325 with a fourth time t4-2. STA 110-*b* generates a timestamp for fourth time t4-2. After receiving the acknowledgment message 330 of the second FTM frame 325, STA 110-*b* transmits a third FTM frame 335. The third FTM frame 335 includes information including the first time t1-2 and the fourth time t4-2 associated with the second FTM frame 325 and the acknowledgment message 330 of the second FTM frame 325. STA 110-*b* also associates the third FTM frame 335 with a first time t1-3 at which the third FTM frame 335 was transmitted by STA 110-*b*. STA 110-*b* generates a timestamp for first time t1-3.

AP 105-*b* receives the third FTM frame 335 via the third antenna of AP 105-*b* and identifies a second time t2-3 at which the third FTM frame 335 was received. AP 105-*b* generates a timestamp for the second time t2-3. AP 105-*b* transmits an acknowledgment message 340 of the third FTM frame 335 via the third antenna of AP 105-*b*. AP 105-*b* associates a third time t3-3 at which the acknowledgment message 340 of the third FTM frame 335 was transmitted via the third antenna of AP 105-*b*. For example, AP 105-*b* generates a timestamp for the third time t3-2. After transmitting the acknowledgment message 340 of the third FTM frame 335, AP 105-*b* switches from the third antenna to a next antenna (e.g., a fourth antenna of AP 105-*b* or back to the first antenna of AP 105-*b* if AP 105 only has three antennas).

STA 110-*b* receives the acknowledgment message 340 of the third FTM frame 335 and associates the receipt of the acknowledgment message 340 of the third FTM frame 335 with a fourth time t4-3. STA 110-*b* generates a timestamp for fourth time t4-3 to be used in a subsequent transmission to AP 105-*b*. Subsequent FTM frames may be transmitted by STA 110-*b* and received by AP 105-*b*. Acknowledgement messages of the subsequent FTM frames may be transmitted by AP 105-*b* and received by STA 110-*b* as described herein.

Figure 4:
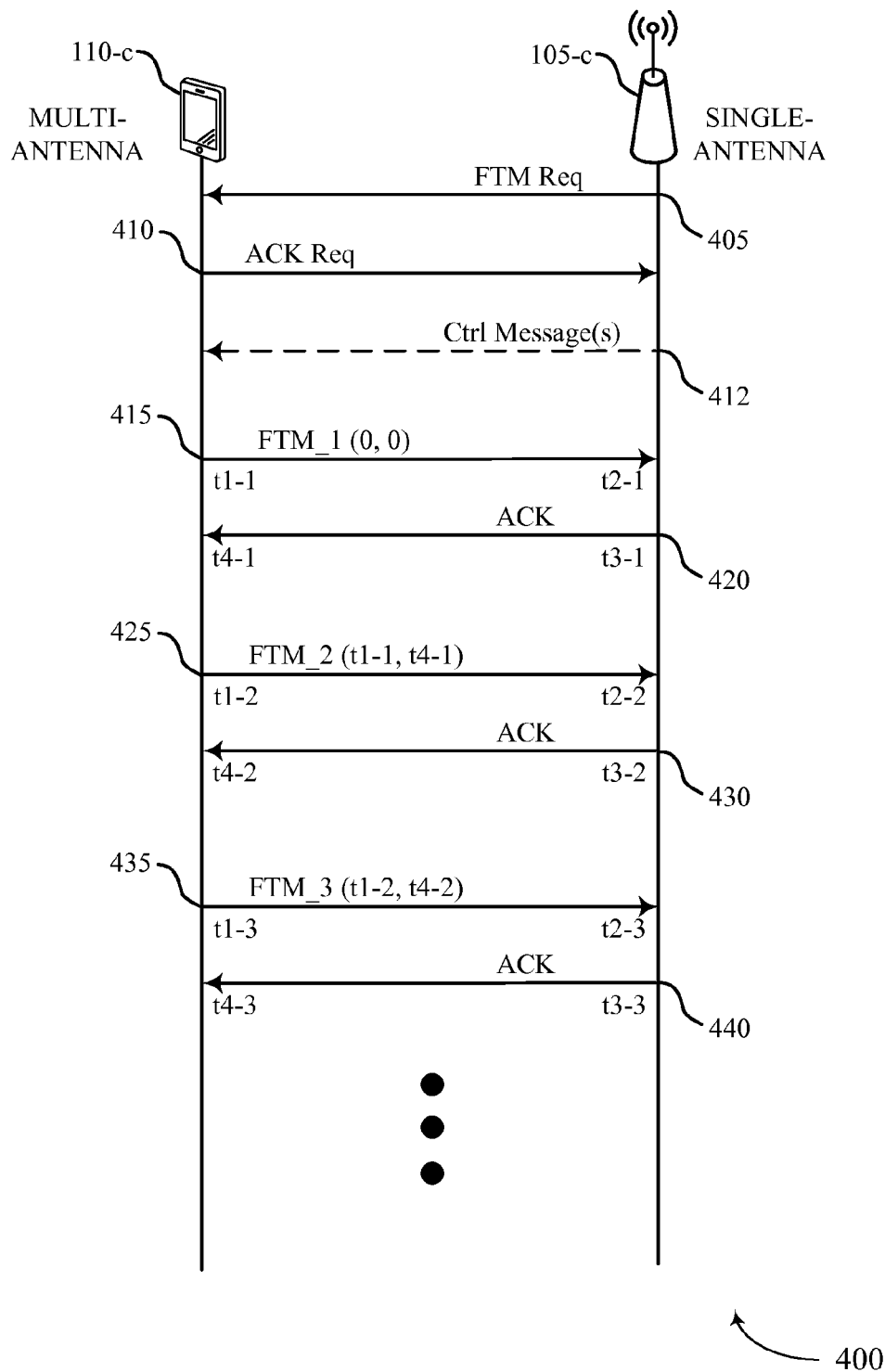
FIG. 4 shows a process flow illustrating an example of wireless communication devices that support ranging over multiple antennas in accordance with various aspects of the present disclosure.

FIG. 4 shows a process flow 400 illustrating an example of wireless communication devices that support ranging over multiple antennas in accordance with various aspects of the present disclosure. The process flow 400 in the wireless communication system shown in FIG. 4 is illustrated with respect to AP 105-*c* and STA 110-*c*, which are respective examples of the AP 105 and STA 110 of FIG. 1. In this example, AP 105-*c* is the initiating device and associates and communicates with STA 110-*c*, which is the responding device. Additionally, AP 105-*c* is a single-antenna device and STA 110-*c* is a multi-antenna device. The multiple antennas of STA 110-*c* are disposed at a same location (e.g., adjacent antennas closely spaced approximately $\lambda/2$ to $4\lambda$ apart). It is to be understood that other combinations of devices (e.g., APs 105 and STAs 110) are contemplated in the example provided with respect to FIG. 4.

AP 105-*c* wishes to engage in timing measurement procedures with STA 110-*c* and determine that STA 110-*c* is available on a wireless communication channel (e.g., communication links 115 or communication links 120 of FIG. 1). AP 105-*c* transmits an FTM request 405 to STA 110-*c*. STA 110-*c* receives the FTM request 405 from AP 105-*c* and transmits an acknowledgment 410 of the FTM request to AP 105-*c*. AP 105-*c* receives the acknowledgment 410 of the FTM request from STA 110-*c* and prepares for receive a number of FTM frames.

In some implementations, AP 105-*c* transmits a control message 412 to STA 110-*c* to coordinate antenna switching by STA 110-*c* between subsequent transmissions of FTM frames. For example, the control message 412 include instructions to STA 110-*c* to switch antennas prior to transmitting subsequent FTM frames or to transmit N number of FTM frames on each antenna and then switch antennas.

STA 110-*c* transmits a first FTM frame 415 associated with a first time t1-1 at which the first FTM frame 415 was transmitted by STA 110-*c*. STA 110-*c* generates a timestamp for first time t1-1 to be used later in the example timing measurement procedure. The first FTM frame 415 includes some general information regarding the FTM frame and is transmitted via a first antenna of STA 110-*c*. AP 105-*c* receives the first FTM frame 415 and identifies a second time t2-1 at which the first FTM frame 415 was received. For example, AP 105-*c* generates a timestamp for the second time t2-1. The first FTM frame 415 is received via the antenna of AP 105-*c*.

AP 105-*c* transmits an acknowledgment message 420 of the first FTM frame 415. AP 105-*c* associates a third time t3-1 at which the acknowledgment message 420 of the first FTM frame 415 was transmitted. For example, AP 105-*c* generates a timestamp for the third time t3-1. STA 110-*c* receives the acknowledgment message 420 of the first FTM frame 415. STA 110-*c* associates the receipt of the acknowledgment message 420 of the first FTM frame with a fourth time t4-1. For example, STA 110-*c* generates a timestamp for the fourth time t4-1.

After receiving the acknowledgment message 420 of the first FTM frame 415, STA 110-*c* switches from the first antenna to a second antenna of STA 110-*c*. STA 110-*c* transmits a second FTM frame 425. The second FTM frame 425 is transmitted via the second antenna of STA 110-*c* and includes information including the first time t1-1 and the fourth time t4-1 associated with the first FTM frame 415 and the acknowledgment message 420 of the first FTM frame 415. STA 110-*c* also associates the second FTM frame 425 with a first time t1-2 at which the second FTM frame 425 was transmitted by STA 110-*c*. STA 110-*c* generates a timestamp for first time t1-2.

AP 105-*c* receives the second FTM frame 425 and identifies a second time t2-2 at which the second FTM frame 425 was received. AP 105-*c* generates a timestamp for the second time t2-2. AP 105-*c* transmits an acknowledgment message 430 of the second FTM frame 425. AP 105-*c* associates a third time t3-2 at which the acknowledgment message 430 of the second FTM frame 425 was transmitted by AP 105-*c*. For example, AP 105-*c* generates a timestamp for the third time t3-2. STA 110-*c* receives the acknowledgment message 430 of the second FTM frame 425 via the second antenna of STA 110-*c*. STA 110-*c* associates the receipt of the acknowledgment message 430 of the second FTM frame 425 with a fourth time t4-2. STA 110-*c* generates a timestamp for fourth time t4-2. After receiving the acknowledgment message 430 of the second FTM frame 425, STA 110-*c* switches from the second antenna to a third antenna of STA 110-*c*.

STA 110-*c* transmits a third FTM frame 435 via the third antenna of STA 110-*c*. The third FTM frame 435 includes information including the first time t1-2 and the fourth time t4-2 associated with the second FTM frame 425 and the acknowledgment message 430 of the second FTM frame 425. STA 110-*c* also associates the third FTM frame 435 with a first time t1-3 at which the third FTM frame 435 was transmitted by STA 110-*c*. STA 110-*c* generates a timestamp for first time t1-3.

AP 105-*c* receives the third FTM frame 435 and identifies a second time t2-3 at which the third FTM frame 435 was received. AP 105-*c* generates a timestamp for the second time t2-3. AP 105-*c* transmits an acknowledgment message 440 of the third FTM frame 435. AP 105-*c* associates a third time t3-3 at which the acknowledgment message 440 of the third FTM frame 435 was transmitted by AP 105-*c*. For example, AP 105-*c* generates a timestamp for the third time t3-2. STA 110-*c* receives the acknowledgment message 440 of the third FTM frame 435 via the third antenna of STA 110-*c*. STA 110-*c* associates the receipt of the acknowledgment message 440 of the third FTM frame 435 with a fourth time t4-3. STA 110-*c* generates a timestamp for fourth time t4-3 to be used in a subsequent transmission to AP 105-*c*. After receiving the acknowledgment message 440 of the third FTM frame 435, STA 110-*c* switches from the third antenna to a next antenna (e.g., a fourth antenna of STA 110-*c* or back to the first antenna of STA 110-*c* if STA 110-*c* only has three antennas). Subsequent FTM frames may be transmitted by STA 110-*c* and received by AP 105-*c*. Acknowledgement messages of the subsequent FTM frames may be transmitted by AP 105-*c* and received by STA 110-*c* as described herein.

The foregoing FIGS. 2 through 4 provide several examples relating to techniques for ranging with multiple antennas, and the techniques of the present disclosure are not limited to the discussion of these examples. It is to be appreciated the even single-chain wireless communication devices and/or timing measurement requirements (e.g., where utilizing multiple receiver chains or simultaneous transmissions is not enabled or not permitted by a relevant standard) can use the disclosed techniques to improve ranging accuracy, for example, by switching the wireless communication device to different antennas to transmit or receive the timing measurement messages.

Figure 5A:
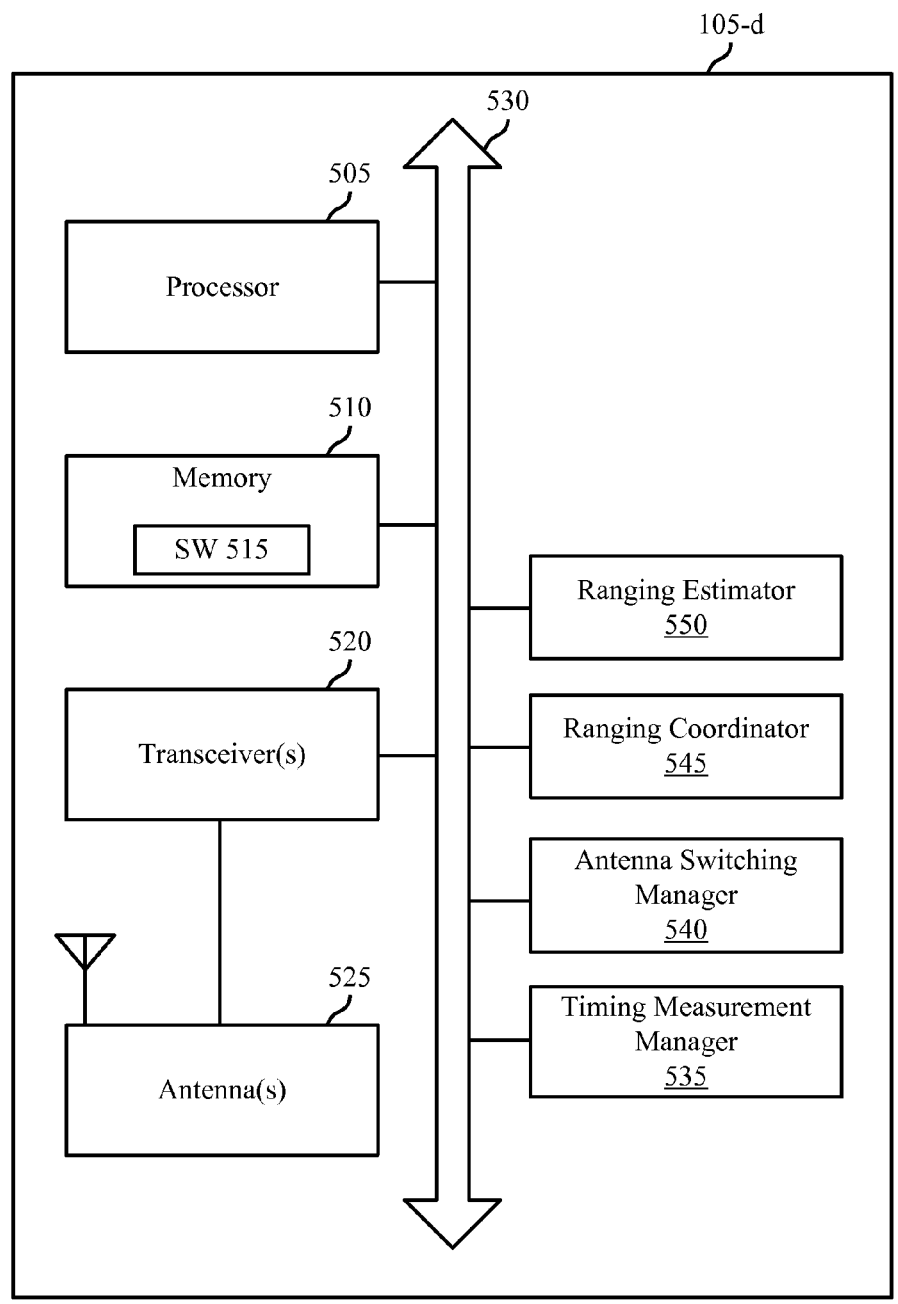
FIGS. 5A and 5B show block diagrams of examples of an AP and STA, respectively, that support ranging over multiple antennas in accordance with various aspects of the present disclosure.

FIG. 5A shows a block diagram 500-*a* of an example AP 105-*d* that supports ranging over multiple antennas in accordance with various aspects of the present disclosure. AP 105-*d* is an example wireless communication device that can be an initiating device or a responding device with respect to FIGS. 1-4. The AP 105-*d* includes a processor 505, a memory 510, one or more transceivers 520, one or more antennas 525, timing measurement manager 535, antenna switching manager 540, ranging coordinator 545, ranging estimator 550. The processor 505, memory 510, transceiver(s) 520, timing measurement manager 535, antenna switching manager 540, ranging coordinator 545, ranging estimator 550 are communicatively coupled with a bus 530, which enables communication between these components. The antenna(s) 525 are communicatively coupled with the transceiver(s) 520.

The processor 505 is an intelligent hardware device, such as a central processing unit (CPU), a microcontroller, an application-specific integrated circuit (ASIC), etc. The processor 505 processes information received through the transceiver(s) 520 and information to be sent to the transceiver(s) 520 for transmission through the antenna(s) 525.

The memory 510 stores computer-readable, computer-executable software (SW) code 515 containing instructions that, when executed, cause the processor 505 or another one of the components of the AP 105-*d* to perform various functions described herein, for example, performing timing management functions associated with ranging over multiple antennas.

The transceiver(s) 520 communicate bi-directionally with other wireless devices, such as APs 105, STAs 110, or other devices. The transceiver(s) 520 include a modem to modulate packets and frames and provide the modulated packets to the antenna(s) 525 for transmission. The modem is additionally used to demodulate packets received from the antenna(s) 525.

The timing measurement manager 535, antenna switching manager 540, ranging coordinator 545, and ranging estimator 550 implement the features described with reference to FIGS. 1-4, as further explained below with respect to FIGS. 6 and 7.

It is to be understood that FIG. 5A illustrates only one possible implementation of a device executing the features of FIGS. 1-4. While the components of FIG. 5A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 5A may be implemented by a single, consolidated hardware block. For example, a single transceiver 520 chip may implement the processor 505, memory 510, timing measurement manager 535, antenna switching manager 540, ranging coordinator 545, and ranging estimator 550.

In still other examples, the features of each component may also be implemented, in whole or in part, with instructions embodied in a memory, formatted to be executed by one or more general or application-specific processors.

Figure 5B:
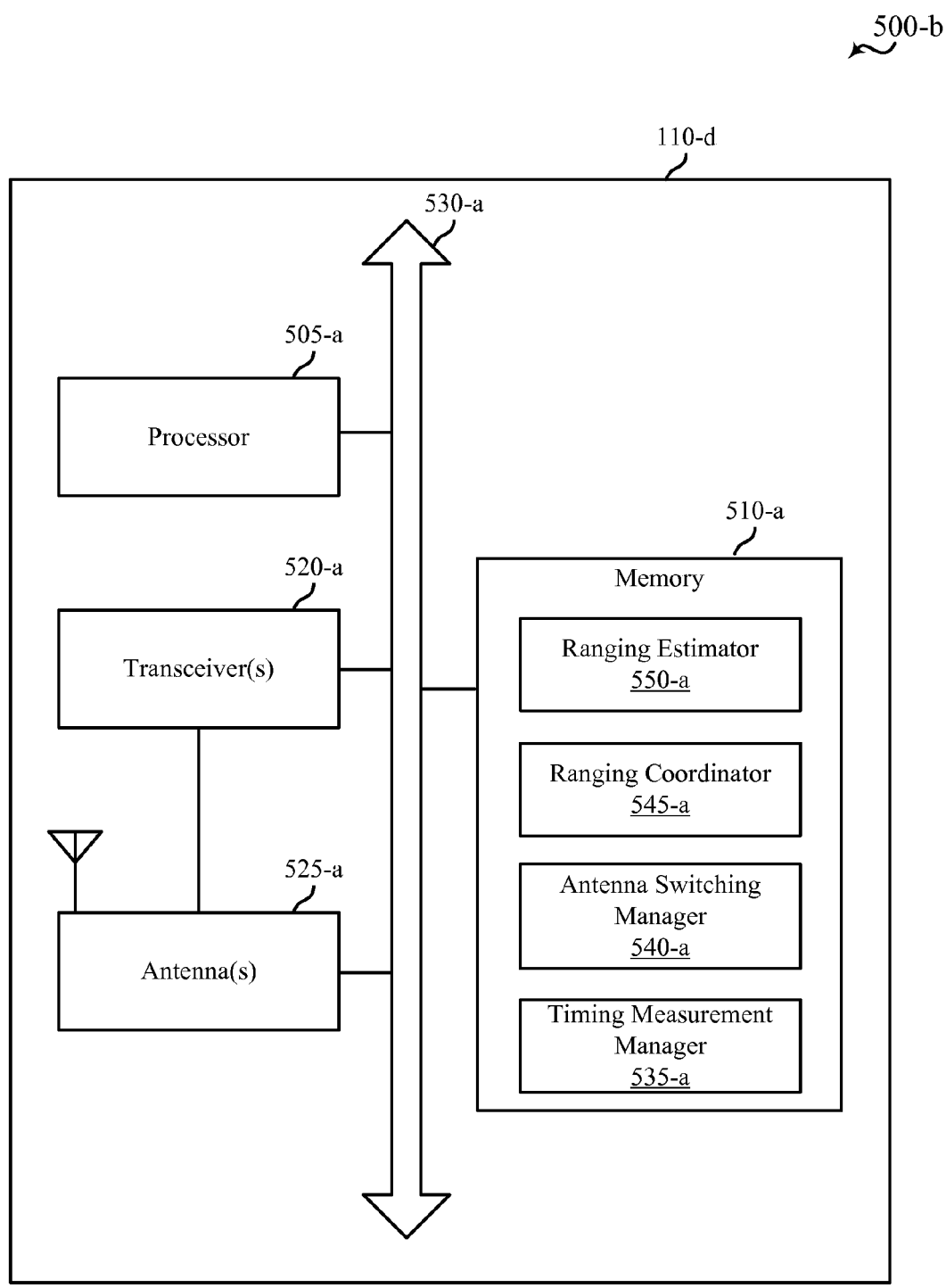

FIG. 5B shows a block diagram 500-*b* of an example STA 110-*d* that supports ranging over multiple antennas in accordance with various aspects of the present disclosure. STA 110-*d* is an example wireless communication device that can be an initiating device or a responding device with respect to FIGS. 1-4. STA 110-*d* includes features of the timing measurement manager 535, the antenna switching manager 540, the ranging coordinator 545, and the ranging estimator 550 implemented as computer-readable code stored on memory 510-*a* and executed by one or more processors 505-*a*. Other combinations of hardware/software may be used to perform the features of one or more of the components of FIGS. 5A and 5B.

It is to be further understood that an AP 105 or an STA 110 under the present disclosure may configured under either of the examples illustrated with respect to FIGS. 5A and 5B, or any other suitable configuration for a particular implementation.

Figure 6:
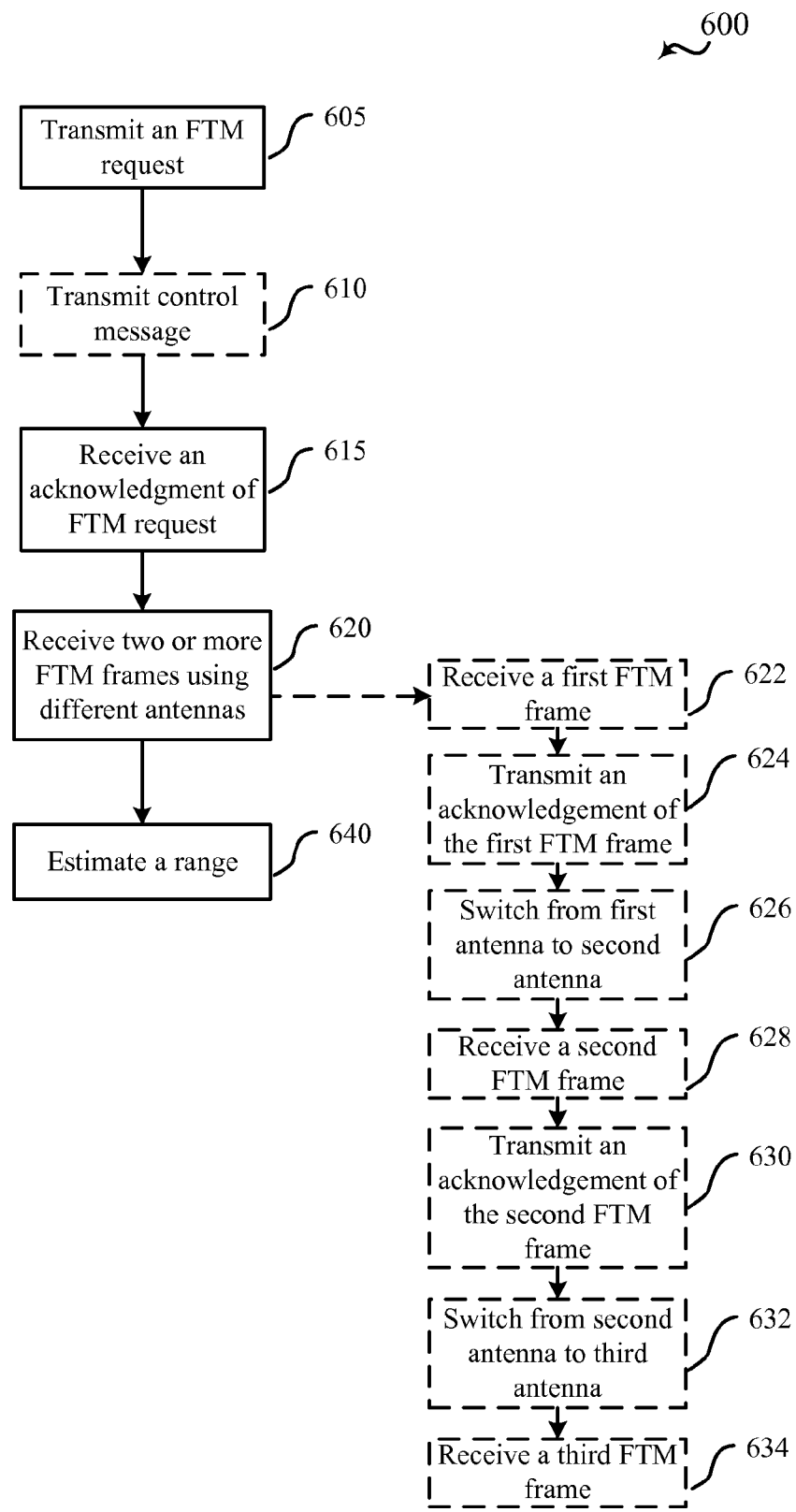
FIG. 6 shows a flow chart that illustrate examples of methods for ranging over multiple antennas from the perspective of an initiating device in accordance with various aspects of the present disclosure.

FIG. 6 shows a flow chart that illustrates one example of a method 600 for wireless communication in accordance with various aspects of the present disclosure. Method 600 may be performed by any of the APs 105 and STAs 110 discussed in the present disclosure, but for clarity method 600 will be described from the perspective of AP 105-*d* of FIG. 5A as the initiating device and STA 110-*d* of 5B as the responding device. It is to be understood that method 600 is just one example of techniques for ranging over multiple antennas, and the operations of the method 600 may be rearranged, performed by other devices and component thereof, and/or otherwise modified such that other implementations are possible.

At block 605, timing measurement manager 535 of AP 105-*d* transmits an FTM request to STA 110-*d*. In this regard, timing measurement manager 535 of AP 105-*d* has determined that STA 110-*d* is available on a wireless communication channel.

At block 610, ranging coordinator 545 of AP 105-*d* transmits a control message to STA 110-*d* to coordinate antenna switching by STA 110-*d* between subsequent transmissions of FTM frames. For example, the control message may include instructions to STA 110-*d* to switch antennas prior to transmitting subsequent FTM frames. The control message may include instructions to STA 110-*d* to transmit a number of FTM frames and then switch to a next antenna. In some implementations, switch coordination information may be included in the FTM request itself. In other implementations, switch coordination information may be determined a priori and is known by STA-d.

At block 615, timing measurement manager 535 of AP 105-*d* receives an acknowledgment of the FTM request from STA 110-*d*. At block 620, timing measurement manager 535 of AP 105-*d* receives two or more FTM frames from STA 110-*d*. Each of the FTM frames can be received using a different antenna of AP 105-*d*, and a corresponding transmission of an acknowledgment of a particular FTM frame can be transmitted from the same antenna as that which received the particular FTM frame. However, in some cases, a corresponding transmission of an acknowledgment of a particular FTM frame is transmitted from a different antenna of AP 105-*d* as that which received the particular FTM frame. An example of the receipt of two or more FTM frames from STA 110-*d* is provided in block 622 through block 634.

At block 622, timing measurement manager 535 of AP 105-*d* receives a first FTM frame associated with a first time at which the first FTM frame was transmitted by STA 110-*d*. The first FTM frame is received via a first antenna of AP 105-*d*. Timing measurement manager 535 of AP 105-*d* identifies a second time at which the first FTM frame was received.

At block 624, timing measurement manager 535 of AP 105-*d* transmits an acknowledgment of the first FTM frame using the first antenna of AP 105-*d*. Timing measurement manager 535 of AP 105-*d* associates a third time (e.g., generates a timestamp) at which the acknowledgment message of the first FTM frame was transmitted via the first antenna of AP 105-*d*. At block 626, antenna switching manager 540 of AP 105-*d* switches or causes AP 105-*d* to switch from the first antenna to a second antenna of AP 105-*d*.

At block 628, timing measurement manager 535 of AP 105-*d* receives a second FTM frame. The second FTM frame is received via the second antenna of AP 105-*d*. The second FTM frame includes the first time at which the first FTM frame was transmitted by STA 110-*d* and a fourth time at which the acknowledgment message of the first FTM frame was received by STA 110-*d*. The second FTM frame is transmitted via an antenna of STA 110-*d* different from the antenna of STA 110-*d* for transmitting the first FTM frame in certain implementations. However, in some implementations, the first FTM frame and the second FTM frame may be transmitted via the same antenna of STA 110-*d*.

At block 630, timing measurement manager 535 of AP 105-*d* transmits an acknowledgment of the second FTM frame. Timing measurement manager 535 of AP 105-*d* associates a third time (e.g., generates a timestamp) at which the acknowledgment message of the second FTM frame was transmitted via the first antenna of AP 105-*d*.

At block 632, antenna switching manager 540 of AP 105-*d* switches or causes AP 105-*d* to switch from the second antenna to a third antenna of AP 105-*d*. In some implementations, AP 105-*d* switches back to the first antenna. For example, AP 105-*d* may switch antennas before receiving each subsequent FTM, but may only have two antennas.

At block 634, timing measurement manager 535 of AP 105-*d* receives a third FTM frame. The third FTM frame is received via the third antenna of AP 105-*d*. The third FTM frame includes the first time at which the second FTM frame was transmitted by STA 110-*d* and a fourth time at which the acknowledgment message of the second FTM frame was received by STA 110-*d*. Additional FTM frames may be received by AP 105-*d* and acknowledgements of those FTM frames transmitted by AP 105-*d* as described herein.

Still referring to FIG. 6, at block 640, ranging estimator 550 of AP 105-*d* estimates a range between AP 105-*d* and STA 110-*d* based at least in part on the FTM frames. For example, ranging estimator 550 of AP 105-*d* may compute an RTT for each of the FTM frames and acknowledgement messages. In some implementations, at least a first FTM frame and the acknowledgment message of the first FTM frame and the second FTM frame and the acknowledgment message of the second FTM frame are used to estimate the range between AP 105-*d* and STA 110-*d*.

For example, ranging estimator 550 of AP 105-*d* computes the RTT for each of the FTM frames and acknowledgement messages by subtracting a first duration from a second duration. The first duration is the difference between a corresponding fourth time and a corresponding first time associated with STA 110-d for a particular FTM frame and acknowledgement message. The second duration is a difference between a corresponding third time and a corresponding second time associated with AP 105-d for the particular FTM frame and acknowledgement message.

Additionally, ranging estimator 550 of AP 105-d may determine a final RTT by computing an average of the RTTs of the FTM frames and acknowledgement messages, a minimum of the RTTs of the FTM frames and acknowledgement messages, and/or a medium of RTTs of the FTM frames and acknowledgement messages. By analyzing the various RTTs and channel information associated with the FTM frames and acknowledgement messages, ranging estimator 550 of AP 105-d may also determine that one or more of the RTTs of the FTM frames and acknowledgement messages is associated with a line-of-sight propagation. Results of the ranging estimator 550 of AP 105-d may be used to determine multi-user (MU) grouping and to set modulation and coding scheme (MCS) rates, for example.

Other variations and implementations of method 600 are contemplated under the present disclosure. For example, the initiating device and responding device may both be STAs 110, the initiating device and responding device may both be APs 105, or the initiating device may be an STA 110 and responding device may be an AP 105. Additionally, FTM frame sequences can be varied in accordance with certain implementations as described herein.

Figure 7:
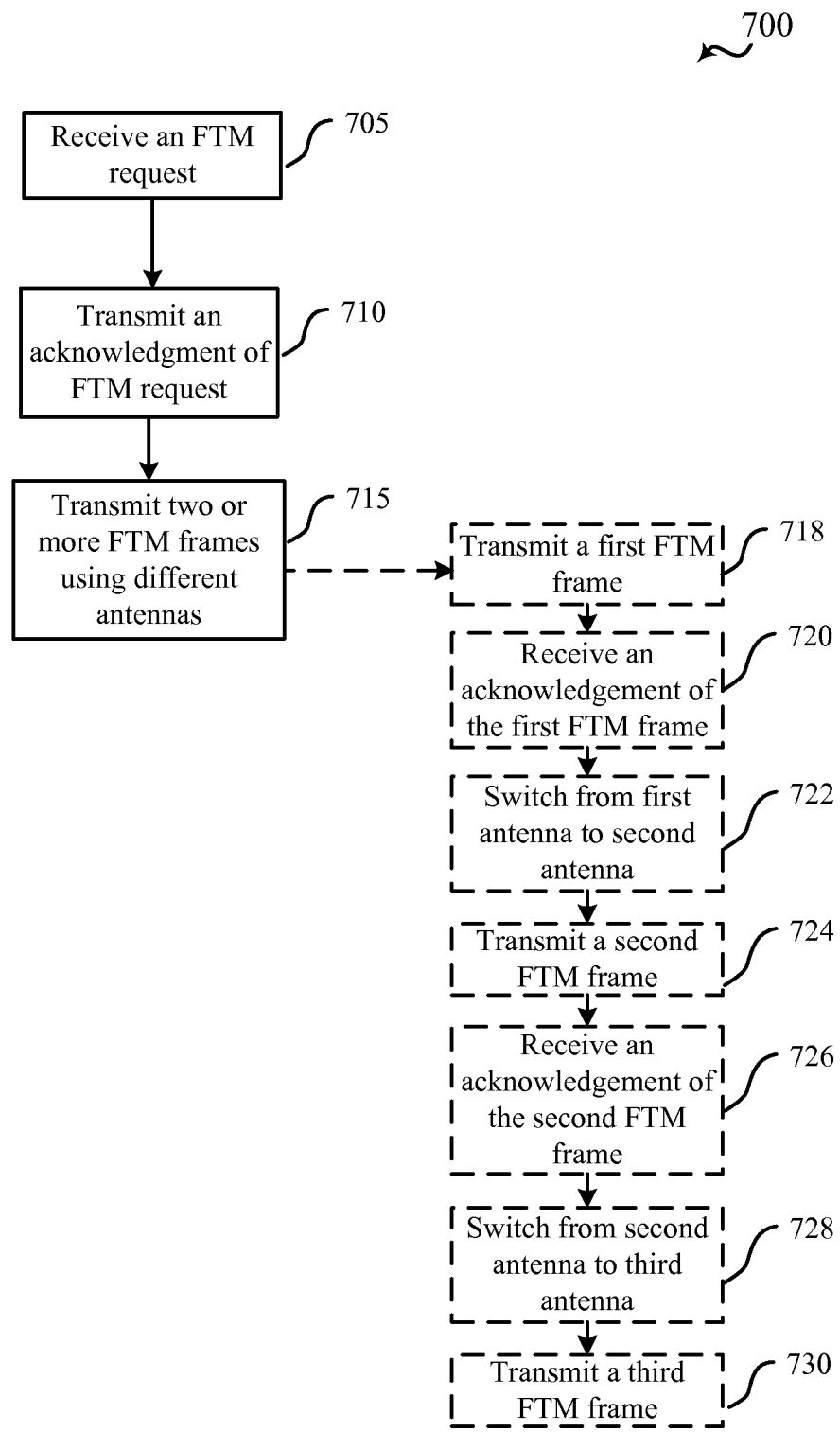
FIG. 7 shows a flow chart that illustrate examples of methods for ranging over multiple antennas from the perspective of a responding device in accordance with various aspects of the present disclosure.

FIG. 7 shows a flow chart that illustrates one example of a method 700 for wireless communication in accordance with various aspects of the present disclosure. Method 700 may be performed by any of the APs 105 and STAs 110 discussed in the present disclosure, but for clarity method 700 will be described from the perspective of AP 105-d of FIG. 5A as the initiating device and STA 110-d of 5B as the responding device. It is to be understood that method 700 is just one example of techniques for ranging over multiple antennas, and the operations of the method 700 may be rearranged, performed by other devices and component thereof, and/or otherwise modified such that other implementations are possible.

At block 705, timing measurement manager 535 of STA 110-d receives an FTM request from AP 105-d. At block 710, timing measurement manager 535 of STA 110-d transmits an acknowledgment of the FTM request to AP 105-d.

At block 715, timing measurement manager 535 of STA 110-d transmits two or more FTM frames to AP 105-d. Each of the FTM frames is transmitted using a different antenna of STA 110-d. Additionally, each of a plurality of acknowledgements of the FTM frames can also be received using a different antenna of STA 110-d. An example of the transmission of two or more FTM frames to AP 105-d is provided in block 718 through block 730.

At block 718, timing measurement manager 535 of STA 110-d transmits a first FTM frame associated with a first time (e.g., generates a timestamp) at which the first FTM frame was transmitted by STA 110-d. The first FTM frame is transmitted via a first antenna of STA 110-d. Upon receipt, AP 105-d identifies a second time at which the first FTM frame was received.

At block 720, timing measurement manager 535 of STA 110-d receives an acknowledgment of the first FTM frame. The acknowledgment of the first FTM frame is associated with a third time at which AP 105-d sends the acknowledgment of the first FTM frame. STA 110-d associates the receipt of the acknowledgment of the first FTM frame with a fourth time (e.g., generates a timestamp).

At block 722, antenna switching manager 540 of STA 110-d switches or causes STA 110-d to switch from the first antenna to a second antenna of STA 110-d.

At block 724, timing measurement manager 535 of STA 110-d transmits a second FTM frame. The second FTM frame is transmitted via the second antenna of STA 110-d. The second FTM frame includes the first time at which the first FTM frame was transmitted by STA 110-d and the fourth time at which the acknowledgment message of the first FTM frame was received by STA 110-d. The second FTM frame is received via an antenna of AP 105-d different from the antenna of AP 105-d for transmitting the first FTM frame. However, in some implementations, the first FTM frame and the second FTM frame is received via the same antenna of STA 110-d. For example, when AP 105-d is a single antenna device or ranging coordinator 545 of AP 105-d determines a transmit/receive timing pattern or antenna switching scheme in which each antenna of STA 110-d transmits to a first antenna of AP 105-d before AP 105-d switches to the next antenna and each antenna of STA 110-d transmits to a second antenna of AP 105-d.

At block 726, timing measurement manager 535 of STA 110-d receives an acknowledgment of the second FTM frame. The acknowledgment of the second FTM frame is associated with a third time at which AP 105-d sends the acknowledgment of the second FTM frame. STA 110-d associates the receipt of the acknowledgment of the second FTM frame with a fourth time (e.g., generates a timestamp).

At block 728, antenna switching manager 540 of STA 110-d switches or causes STA 110-d to switch from the second antenna to a third antenna of STA 110-d.

At block 730, timing measurement manager 535 of STA 110-d transmits a third FTM frame. The third FTM frame is transmitted via the third antenna of STA 110-d. The third FTM frame includes the first time at which the second FTM frame was transmitted by STA 110-d and the fourth time at which the acknowledgment message of the second FTM frame was received by STA 110-d. Additional FTM frames may be transmitted by STA 110-d and acknowledgements of those FTM frames received by STA 110-d as described herein.

Other variations and implementations of method 700 are contemplated under the present disclosure. For example, the initiating device and responding device may both be STAs 110. The initiating device and responding device may both be APs 110, or the initiating device may be an STA 110 and responding device may be an AP 105. Additionally, FTM frame sequences can be varied in accordance with certain implementations as described herein. Moreover, aspects of method 600 may be included in method 700, and aspects of method 700 may be included in method 600.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, by a first wireless communication device having a plurality of antennas disposed at a localized position, a plurality of fine timing management (FTM) messages from a second wireless communication device;
   transmitting, by the first wireless communication device, a plurality of FTM responses to the second wireless communication device, wherein each subsequent FTM response of the plurality of FTM responses is transmitted using a different antenna of the first wireless communication device; and
   estimating a range between the first wireless communication device and the second wireless communication device based at least in part on the plurality of FTM messages.

2. The method of claim 1, wherein receiving the plurality of FTM messages by the first wireless communication device comprises:
   receiving a first FTM message; and
   receiving a second FTM message, the second FTM message comprising round trip time information corresponding to the first FTM message from a perspective of the second wireless communication device, and
   wherein transmitting the plurality of FTM responses by the first wireless communication device comprises:
   transmitting a first FTM response corresponding to the first FTM message using a first antenna of the first wireless communication device; and
   transmitting a second FTM response corresponding to the second FTM message using a second antenna of the first wireless communication device.

3. The method of claim 2, wherein the second antenna is disposed a distance from the first antenna that is less than a distance equal to two wavelengths of a lowest transmission frequency associated with the plurality of antennas disposed at the localized position, and wherein the round trip time information is based at least in part on an elapsed amount of time between a transmission of the first FTM message by the second wireless communication device and a receipt of the first FTM response by the second wireless communication device.

4. The method of claim 2, wherein receiving the plurality of FTM messages by the first wireless communication device comprises:

receiving a third FTM message, the third FTM message comprising round trip time information corresponding to the second FTM message from the perspective of the second wireless communication device, and wherein transmitting the plurality of FTM responses by the first wireless communication device comprises:

transmitting a third FTM response corresponding to the third FTM message using a third antenna of the first wireless communication device, and wherein estimating the range between the first wireless communication device and the second wireless communication device is further based at least in part on the third FTM message.

5. The method of claim 4, wherein estimating the range between the first wireless communication device and the second wireless communication device further comprises:

determining an estimated round trip time between the first wireless communication device and the second wireless communication device based at least in part on the round trip time information corresponding to the first FTM message and the round trip time information corresponding to the second FTM message.

6. The method of claim 4, further comprising:

determining that one of the plurality of antennas of the first wireless communication device is associated with a line-of-sight propagation between the first wireless communication device and the second wireless communication device based at least in part on the plurality of FTM messages.

7. The method of claim 1, further comprising:

transmitting a control message to the second wireless communication device to coordinate antenna switching by the second wireless communication device between subsequent transmissions of the plurality of FTM messages.

8. The method of claim 1, wherein each of the plurality of FTM messages is received using a different antenna of the first wireless communication device.

9. The method of claim 1, wherein each of the plurality of FTM messages is an FTM frame and each of the plurality of FTM responses is an acknowledgment of an FTM frame.

10. A communication device, comprising:

a plurality of antennas disposed at a localized position;

a timing measurement manager to receive a plurality of fine timing management (FTM) messages from a responding wireless communication device;

the timing measurement manager to transmit a plurality of FTM responses to the responding wireless communication device;

an antenna switching manager to switch antennas such that each subsequent FTM response of the plurality of FTM responses is transmitted using a different antenna of the plurality of antennas; and a ranging estimator to estimate a range between the communication device and the responding wireless communication device based at least in part on the plurality of FTM messages.

11. The communication device of claim 10, wherein the timing measurement manager is further to:

receive a first FTM message;

transmit a first FTM response corresponding to the first FTM message using a first antenna of the plurality of antennas;

receive a second FTM message, the second FTM message comprising round trip time information corresponding to the first FTM message from a perspective of the responding wireless communication device; and transmit a second FTM response using a second antenna of the plurality of antennas.

12. The communication device of claim 11, wherein the second antenna is disposed a distance from the first antenna that is less than a distance equal to two wavelengths of a lowest transmission frequency associated with the plurality of antennas disposed at the localized position, and wherein the round trip time information is based at least in part on an elapsed amount of time between a transmission of the first FTM message by the responding wireless communication device and a receipt of the first FTM response by the responding wireless communication device.

13. The communication device of claim 11, wherein the timing measurement manager is further to:

receive a third FTM message, the third FTM message comprising round trip time information corresponding to the second FTM message from the perspective of the responding wireless communication device; and transmit a third FTM response corresponding to the third FTM message using a third antenna of the plurality of antennas, and wherein the ranging estimator is further to:

estimate the range between the communication device and the responding wireless communication device based at least in part on the third FTM message.

14. The communication device of claim 13, wherein the ranging estimator is further to:

determine an estimated round trip time between the first wireless communication device and the second wireless communication device based at least in part on the round trip time information corresponding to the first FTM message and the round trip time information corresponding to the second FTM message.

15. The communication device of claim 13, wherein the ranging estimator is further to:

determine that one of the plurality of antennas of the first wireless communication device is associated with a line-of-sight propagation between the first wireless communication device and the second wireless communication device based at least in part on the plurality of FTM messages.

16. The communication device of claim 10, further comprising:

a ranging coordinator to transmit a control message to the responding wireless communication device to coordinate antenna switching by the responding wireless communication device between subsequent transmissions of the plurality of FTM messages.

17. The communication device of claim 10, wherein each of the plurality of FTM messages is received using a different antenna of the first wireless communication device.

18. The communication device of claim 10, wherein each of the plurality of FTM messages is an FTM frame and each of the plurality of FTM responses is an acknowledgment of an FTM frame.

19. A non-transitory computer-readable medium comprising computer-readable code that, when executed, causes a device to:

receive a plurality of fine timing management (FTM) messages from a responding wireless communication device;

transmit a plurality of FTM response to the responding wireless communication device;

switch antennas such that each subsequent FTM response of the plurality of FTM responses is transmitted using a different antenna of a plurality of antennas disposed at a localized position; and estimate a range between the device and the responding wireless communication device based at least in part on the plurality of FTM messages.

20. The non-transitory computer-readable medium of 19, wherein the computer-readable code that, when executed, further causes the device to:
receive a first FTM message;
transmit a first FTM response corresponding to the first FTM message using a first antenna of the plurality of antennas;
receive a second FTM message, the second FTM message comprising round trip time information corresponding to the first FTM message from a perspective of the responding wireless communication device; and
transmit a second FTM response using a second antenna of the plurality of antennas.

21. The non-transitory computer-readable medium of 20, wherein the computer-readable code that, when executed, further causes the device to:
receive a third FTM message, the third FTM message comprising round trip time information corresponding to the second FTM message from the perspective of the responding wireless communication device;
transmit a third FTM response corresponding to the third FTM message using a third antenna of the plurality of antennas; and
estimate the range between the communication device and the responding wireless communication device based at least in part on the third FTM message.

22. The non-transitory computer-readable medium of 19, wherein the computer-readable code that, when executed, further causes the device to:
transmit a control message to the second wireless communication device to coordinate antenna switching by the second wireless communication device between subsequent transmissions of the plurality of FTM messages.

23. A method for wireless communication, comprising:
receiving, by a second wireless communication device having a plurality of antennas disposed at a localized position, a fine timing measurement (FTM) request from a first wireless communication device; and
transmitting, by the second wireless communication device, a plurality of FTM messages to the first wireless communication device, wherein each subsequent FTM message of the plurality of FTM messages is transmitted using a different antenna of the second wireless communication device.

24. The method of claim 23, wherein transmitting the plurality of FTM messages to the first wireless communication device comprises:
transmitting a first FTM message using a first antenna of the second wireless communication device; and
transmitting a second FTM message using a second antenna of the second wireless communication device, the second FTM message comprising round trip time information corresponding to the first FTM message from a perspective of the second wireless communication device.

25. The method of claim 24, wherein the second antenna is disposed a distance from the first antenna that is less than a distance equal to two wavelengths of a lowest transmission frequency associated with the plurality of antennas disposed at the localized position.

26. The method of claim 24, further comprising:
receiving a first FTM response corresponding to the first FTM message from the first wireless communication device, and
wherein the round trip time information is based at least in part on an elapsed amount of time between a transmission of the first FTM message by the second wireless communication device and a receipt of the first FTM response by the second wireless communication device.

27. The method of claim 24, wherein transmitting the plurality of FTM messages to the first wireless communication device comprises:
transmitting a third FTM message using a third antenna of the second wireless communication device, the third FTM message comprising round trip time information corresponding to the second FTM message from the perspective of the second wireless communication device.

28. The method of claim 23, further comprising:
receiving a control message from the first wireless communication device to coordinate antenna switching by the second wireless communication device between subsequent transmissions of the plurality of FTM messages.

29. The method of claim 23, further comprising:
receiving, by the second wireless communication device, a plurality of FTM responses from the first wireless communication device, wherein each of the plurality of FTM responses is received using a different antenna of the second wireless communication device.

30. The method of claim 23, wherein each of the plurality of FTM messages is an FTM frame.

* * * * *